(No Model.)
2 Sheets—Sheet 1.

H. C. SEARS.
VEHICLE.

No. 264,901.  Patented Sept. 26, 1882.

WITNESSES
Willard C. Fogg.
Fred. Harris

INVENTOR
Henry C. Sears
by his attys
Clarke & Raymond

N. PETERS, Photo-Lithographer, Washington, D. C.

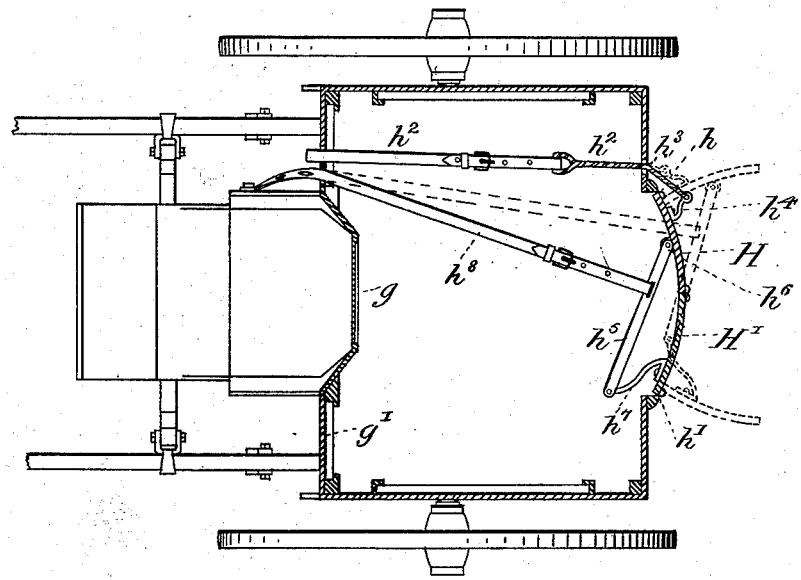

UNITED STATES PATENT OFFICE.

HENRY C. SEARS, OF BOSTON, MASSACHUSETTS, ASSIGNOR TO D. P. NICHOLS & CO., OF SAME PLACE.

VEHICLE.

SPECIFICATION forming part of Letters Patent No. 264,901, dated September 26, 1882.

Application filed June 3, 1882. (No model.)

*To all whom it may concern:*

Be it known that I, HENRY C. SEARS, of Boston, in the county of Suffolk and State of Massachusetts, a citizen of the United States, have invented a certain new and useful Improvement in Vehicles, of which the following is a full, clear, and exact description, reference being had to the accompanying drawings, forming a part of this specification, in explaining its nature.

The nature of the invention consists, first, in a new arrangement of running-gear and manner of hanging the body of the vehicle to the shafts and axle; second, in setting the driving-seat partly within the front wall of the vehicle.

Figure 1:
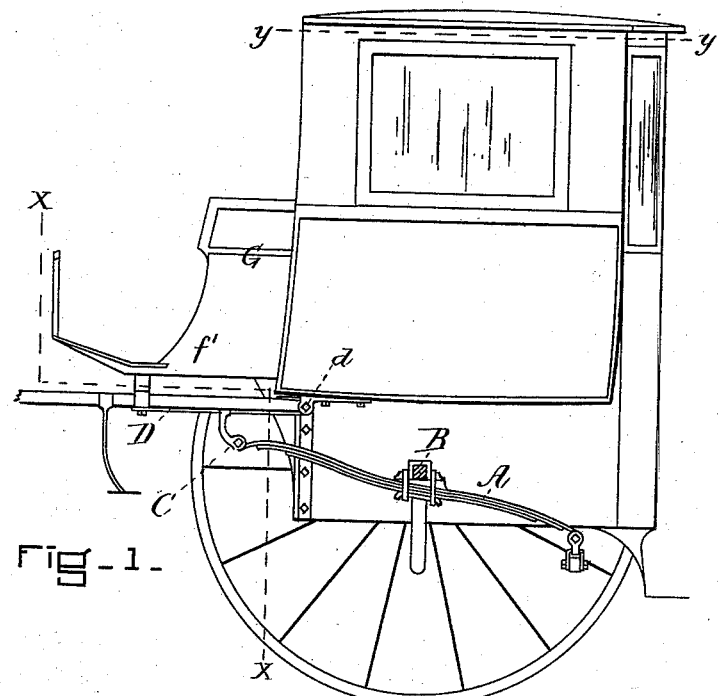
Figure 2:
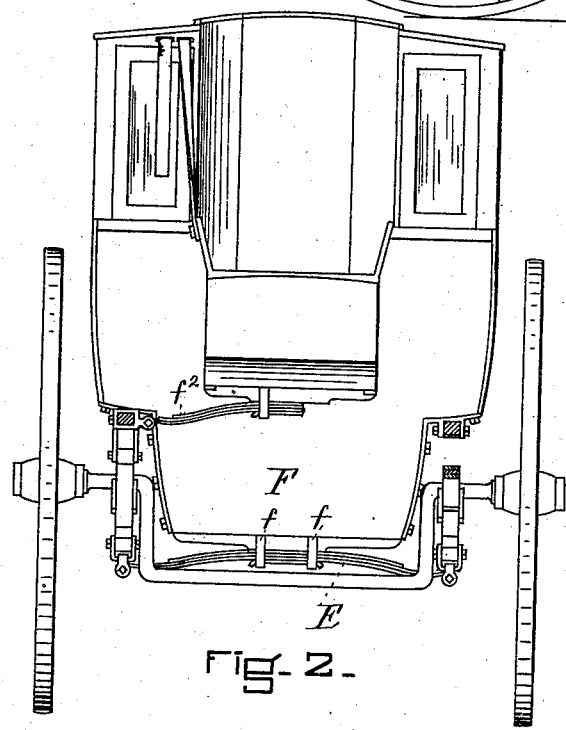

Figure 1 is a side elevation of the vehicle. Fig. 2 is a vertical section upon the line $x\,x$ of Fig. 1. Fig. 3 is a horizontal section upon the line $y\,y$ of Fig. 1.

This vehicle is adapted for carrying passengers in cities and towns of large size, and therefore it is very essential that its construction should be simple and strong, and that it should ride easily; and to accomplish this purpose I attach the side springs, A, to the bent or crank axle B and fasten the forward ends of said springs to the brackets or arms C, which are bolted to the shafts D, or directly to the shafts, and the rear ends of the springs support the cross-spring E, to which the body F of the vehicle is attached. The shafts D are pivoted at $d$ to the body of the vehicle, and the front extension, $f'$, of the body, comprising a portion of the driver's seat, is supported upon the cross-spring $f^2$, which is attached at each end to the shafts, the spring spanning the space between the two shafts. By this construction it will be noticed the body of the vehicle is supported directly upon the rear spring, E, the shaft-spring $f^2$, and the forward ends of the side springs, A, by means of the jointed shaft-connection; and also that the construction is very simple, very strong, and provides a very flexible or elastic mounting of the vehicle upon its axle.

In order that the vehicle may be made more compact and shorter, and that the weight of the driver may be brought nearer the axle, instead of placing the driver's seat G entirely in front of the body of the vehicle, as is customary, I have set it back, so that the rear portion, $g$, shall be within the front wall, $g'$, of the vehicle, the central portion of the front shell of the vehicle being extended backwardly, as represented in Fig. 3. This building of the seat into the body of the vehicle does not necessitate an increase in the length of the body of the vehicle to accommodate more passengers or provide more room than if the seat were not so built, because it projects into the central space thereof, and of course does not take any of the room reserved for the side seats. It will be noticed, also, that by giving the shafts a pivoted connection with the body of the vehicle at the front means are provided for the yielding of the front of the vehicle upon its supporting-springs, which would not be the case if the shafts were rigidly attached to the body of the vehicle, and that by connecting the shafts with the axle by means of the side springs direct draft upon the axle is obtained in a simple and inexpensive way.

The manner of attaching the side springs to the axle, and the means of attaching the cross-springs, both on the shafts and at the rear, to the shafts and to the side springs, need not be described here, as there are a great many well-known ways, of course, of accomplishing this object. The springs employed are the well-known leaf-spring, and the shape of the rear spring is very well represented in Fig. 2 and the shape of the side springs in Fig. 1.

I am aware of Patent No. 1,789, of 1840, to I. Page, and of British Patent No. 4,388 of 1876, and I do not claim any of the features shown and described therein, as they do not embrace the spirit of my invention.

It will be noticed that the side springs, A, are secured at or near the center of their lengths to the crank pins or wrists of the axle, and that they extend backwardly therefrom sufficiently to lay hold of the ends of the cross-spring E and forward sufficiently to be secured directly to the shafts.

It will also be observed that the construction is very simple and cheap, yet strong, is easy for the horse, because it provides for a direct draft to the crank pins or wrists, and provides a very easy riding vehicle.

Having thus fully described my invention, I claim and desire to secure by Letters Patent of the United States—

1. In a two-wheeled vehicle, the combination of the crank-axle B, the hinged or jointed shaft D, the side springs, A, secured at or near their centers to the crank pin or wrist, at their forward ends to the shafts, and at their rear ends to the cross spring E, and the body F, all substantially as and for the purposes described.

2. The combination of the crank-axle B, the side springs, A, secured at or near the center of their lengths to the crank pins or wrists, at their rear ends to the cross-spring E, and at their front ends to the shafts, the cross-spring E, shafts D, the front spring, $f^2$, the body F, and the projecting portion $f'$, all substantially as and for the purposes described.

3. In a vehicle having a close front and a rear entrance, a space for the driver and driver's seat, formed in the front wall of the vehicle back of the front line of the side portions, and extending from a point in line with or just above the inclosed seats of the vehicle to the top, all substantially as and for the purposes described.

HENRY C. SEARS.

Witnesses:
F. F. RAYMOND, 2d,
WILLARD C. FOGG.